S. Yates,
Soldering Clamp.

N° 57,615. Patented Aug. 28, 1866.

Witnesses:
A. Moore
L. W. Fogg

Inventor:
Samuel Yates
By Helmick & Winn
his Atty

UNITED STATES PATENT OFFICE.

SAMUEL YATES, OF CLARENCE, IOWA.

IMPROVED MACHINE FOR MANUFACTURING EAVES-TROUGHS.

Specification forming part of Letters Patent No. 57,615, dated August 28, 1866.

*To all whom it may concern:*

Be it known that I, SAMUEL YATES, of Clarence, in the county of Cedar, in the State of Iowa, have invented a new and useful Machine for Manufacturing Tin Spouting for Houses; and I do hereby declare that the following is a full, clear, and exact description of the construction and operation of the same, reference being had to the annexed drawings, making a part of this specification, in which—

Figure 1:
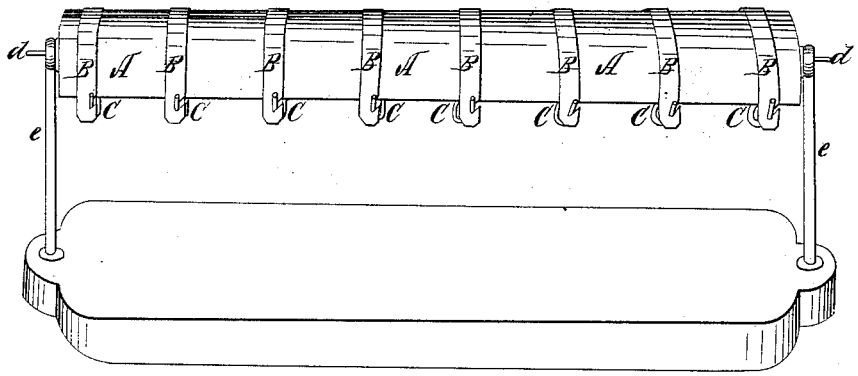
Figure 2:
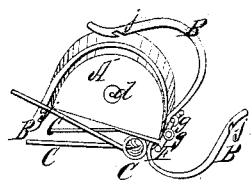
Figure 3:
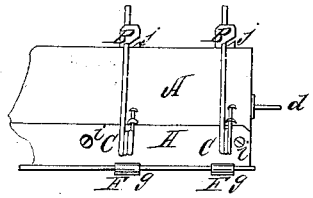

Figure 1 is a perspective view. Fig. 2 is an end view, showing the form of the oval bar A, on which the spouting is soldered, the bands B, by which it is firmly held in position for soldering, and the springs C, by which the bands are fastened during the process of soldering. Fig. 3 is a view of a section of the flat surface of the bar A, showing the manner in which the bands B are attached and hinged and the springs C are fastened.

The machine is constructed as follows: The half-oval bar of wood is suspended on pivots *d d*, inserted in each end in such a manner that it will (with bands, springs, &c.) balance freely, keeping the oval side uppermost, these pivots *d d* entering two upright posts of iron, *e e*.

The bands B, in which, near the hinge F, there is a short curve, *g*, intended to clasp the bead in the spouting, are fastened upon a metallic plate, H, having a straight edge where the bands are attached, upon which the edge of the tin must rest, thereby giving a uniform gage to the spouting. This metallic plate H is firmly fastened by screws *i* to the flat surface of the bar A.

The springs C are made of steel wire spirally coiled, one end being bent and inserted in the wood just beyond the edge of the metallic plate H, the other reaching across the flat surface of the bar A and catching in a notch, *j*, made for that purpose in the band B, thereby holding it firmly in position.

The bands B hold the tin firmly in place, each band binding the tin so near the joint as merely to leave room for soldering, securing smooth solid joints and a uniform gage.

The bar turning easily enables the operator to solder much more rapidly than by any method heretofore in use, being able hereby to solder the whole seven (7) joints with one heating of the iron, and the round surface of the bar secures a perfect and uniform curve in the spouting when finished.

I do not claim particularly the forming of the spouting on a cylinder, as I am aware that this has been done before; but What I do claim is—

The entire combination of the half-oval bar A, the bands B, the spiral springs C, and each and every part of the machine, which combination greatly facilitates the process of making tin spouting for houses, lessens the labor, and secures more perfect spouting when finished.

SAMUEL YATES.

Witnesses:
JNO. D. McKOWN,
JOHN HOOD.